United States Patent
Chen

(10) Patent No.: US 6,643,736 B1
(45) Date of Patent: Nov. 4, 2003

(54) SCRATCH PAD MEMORIES

(75) Inventor: Hong-Yi Hubert Chen, Fremont, CA (US)

(73) Assignee: Arm Limited, Cambridge (GB)

( * ) Notice: Subject to any disclaimer, the term of this patent is extended or adjusted under 35 U.S.C. 154(b) by 268 days.

(21) Appl. No.: 09/650,244

(22) Filed: Aug. 29, 2000

(51) Int. Cl.[7] .............................................. G06F 12/08
(52) U.S. Cl. ........................ 711/117; 711/122; 711/123; 712/205
(58) Field of Search .............................. 711/117, 3, 119, 711/122, 132, 120, 123, 173; 345/503, 551, 557; 713/500; 712/204–207

(56) References Cited

U.S. PATENT DOCUMENTS

| | | | | |
|---|---|---|---|---|
| 4,843,542 A | * | 6/1989 | Dashiell et al. .............. | 711/119 |
| 5,067,078 A | * | 11/1991 | Talgam et al. ................. | 711/3 |
| 5,553,276 A | * | 9/1996 | Dean .......................... | 713/500 |
| 5,893,159 A | * | 4/1999 | Schneider .................... | 711/150 |
| 5,922,066 A | * | 7/1999 | Cho et al. .................... | 712/204 |
| 5,966,734 A | * | 10/1999 | Mohamed et al. .......... | 711/173 |

\* cited by examiner

Primary Examiner—Nasser Moazzami
(74) Attorney, Agent, or Firm—Nixon & Vanderhye, P.C.

(57) ABSTRACT

A processing system is disclosed. The processing system includes at least one cache and at least one scratch pad memory. The system also includes a processor for accessing the at least one cache and at least one scratch pad memory. The at least one scratch pad memory is smaller in size than the at least one cache. The processor accesses the data in the at least one scratch pad memory before accessing the at least one cache to determine if the appropriate data is therein. There are two important features of the present invention. The first feature is that an instruction can be utilized to fill a scratch pad memory with the appropriate data in an efficient manner. The second feature is that once the scratch pad has the appropriate data, it can be accessed more efficiently to retrieve this data within the cache and memory space not needed for this data. This has a particular advantage for frequently used routines, such as a mathematical algorithm to minimize the amount of space utilized in the cache for such routines. Accordingly, the complexity of the cache is not required using the scratch pad memory as well as space within the cache is not utilized.

3 Claims, 3 Drawing Sheets

114

SCRATCH PAD MEMORIES

FIELD OF THE INVENTION

The present invention relates generally to a processing system and more particularly to a processing system that includes a scratch pad for improved performance.

BACKGROUND OF THE INVENTION

Processor architectures are utilized for a variety of functions. FIG. 1 is a simple block diagram of a conventional processing system 10. The processing system 10 includes a core processor 12 which controls a system bus interface unit 18. The core processor 12 also interacts with an instruction cache and a data cache. Typically, the core processor retrieves information from the data cache or the instructions for operation rather than obtaining data from system memory as is well known. Since the data cache and instruction cache are smaller in size, data can be accessed from them more readily if it is resident therein.

In this type of processing system, oftentimes small routines are provided which can further affect the performance of the system. Accordingly, the caches are placed therein to is allow faster access rather than having to access system memory. Although these caches are faster than system memory, they still are relatively slow if the routine needs to be accessed on a continual basis therefrom. For example, small routines may take up several cycles which can become a performance bottleneck in a processing system. So what is desired is a system which will allow one to more quickly access and obtain certain routines and therefore improve the overall performance of the system in the data cache without wasting memory space.

The system must be easy to implement utilizing existing technologies. The present invention addresses such a need.

SUMMARY OF THE INVENTION

A processing system is disclosed. The processing system includes at least one cache and at least one scratch pad memory. The system also includes a processor for accessing the at least one cache and at least one scratch pad memory. The at least one scratch pad memory is smaller in size than the at least one cache. The processor accesses the data in the at least one scratch pad memory before accessing the at least one cache to determine if the appropriate data is therein.

There are two important features of the present invention. The first feature is that an instruction can be utilized to fill a scratch pad memory with the appropriate data in an efficient manner. The second feature is that once the scratch pad has the appropriate data, it can be accessed more efficiently to retrieve this data within the cache and memory space not needed for this data. This has a particular advantage for frequently used routines, such as a mathematical algorithm to minimize the amount of space utilized in the cache for such routines. Accordingly, the complexity of the cache is not required using the scratch pad memory as well as space within the cache is not utilized.

DETAILED DESCRIPTION

The present invention relates generally to a processing system and more particularly to a processing system that includes a scratch pad for improved performance. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
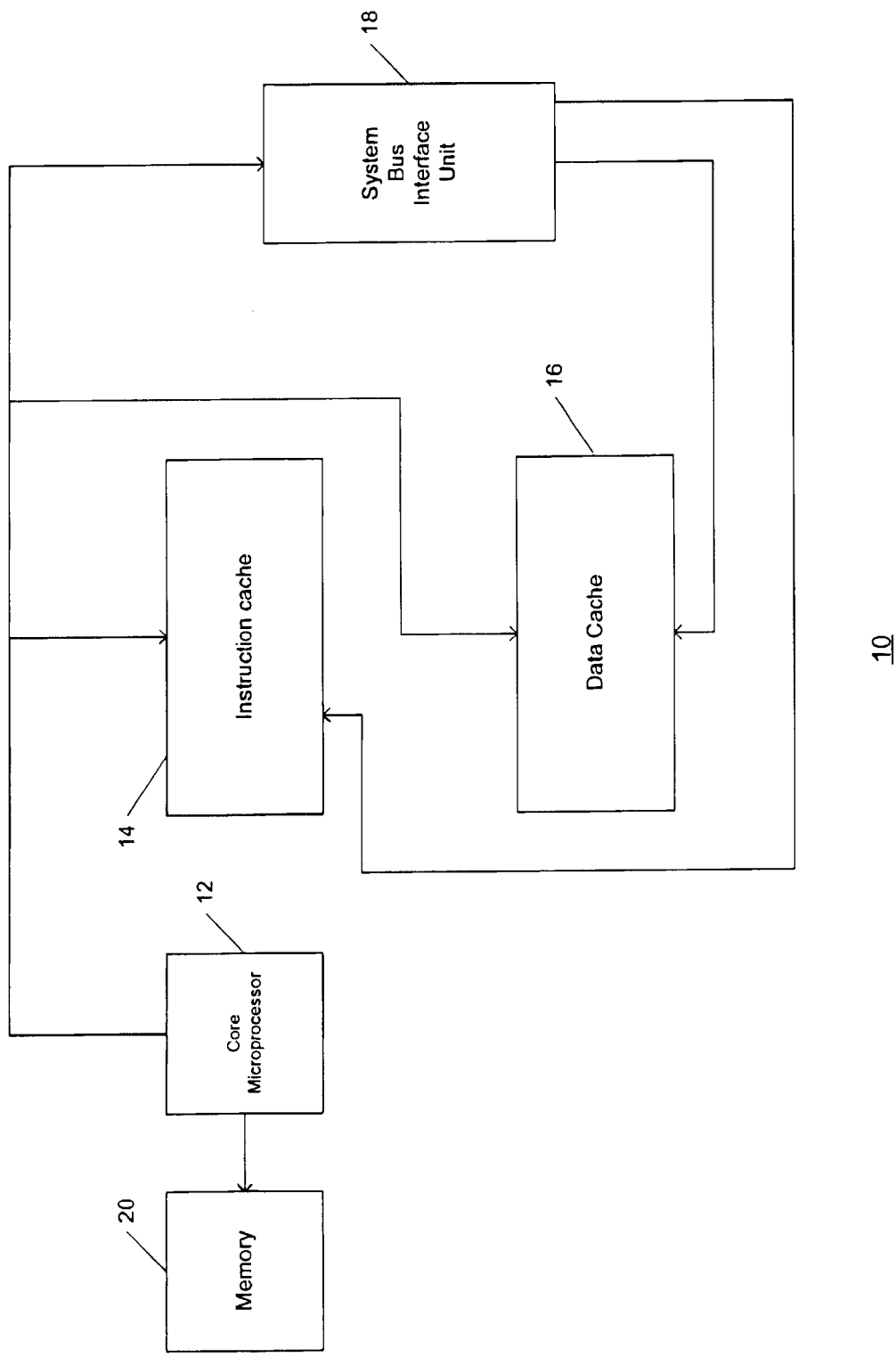
FIG. 1 is a simple block diagram of a conventional processing system.
Figure 2:
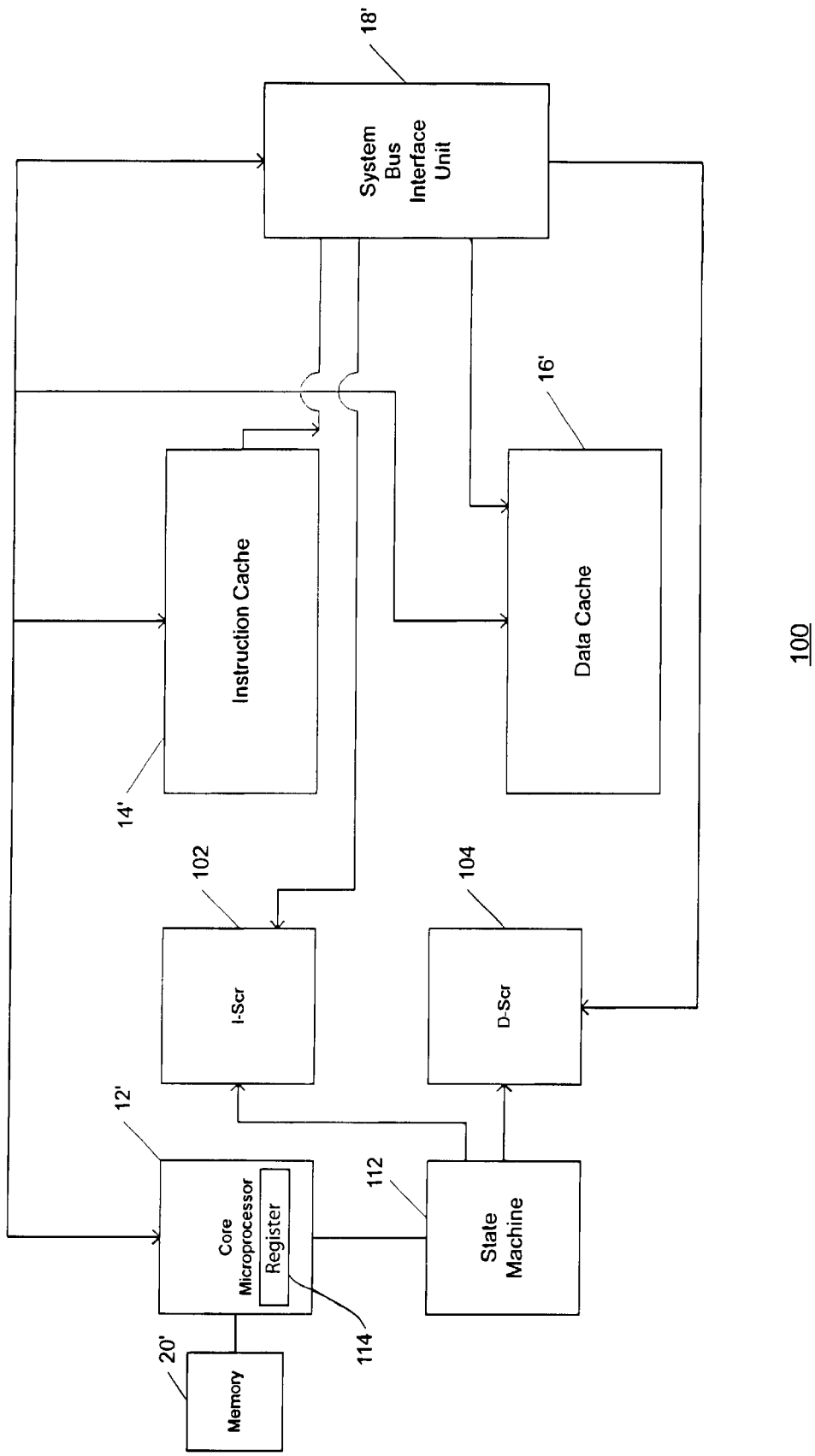
FIG. 2 is a simple block diagram of a system in accordance with the present invention.

FIG. 2 is a block diagram of a system 100 in accordance with the present invention. Those elements that are similar to those of FIG. 1 are given similar reference numbers. As is seen, a scratch pad memory 102 is provided for the instruction cache and a scratch pad memory 104 is provided with the data cache 16'. The scratch pad memories 102 and 104 are typically 2 Kb in size as compared to a 8 Kb data cache and 8 Kb instruction cache. In a preferred embodiment, the scratch pad memories 102 and 104 have the highest priority when accessing data. A state machine 112 is coupled to the instruction cache 14' and data cache 16' and interacts with scratch pad memories 102, 104 and a register 114 with the core processor 12'. The state machine 112 provides access to the register 114 within the core processor 12'.

Figure 3:
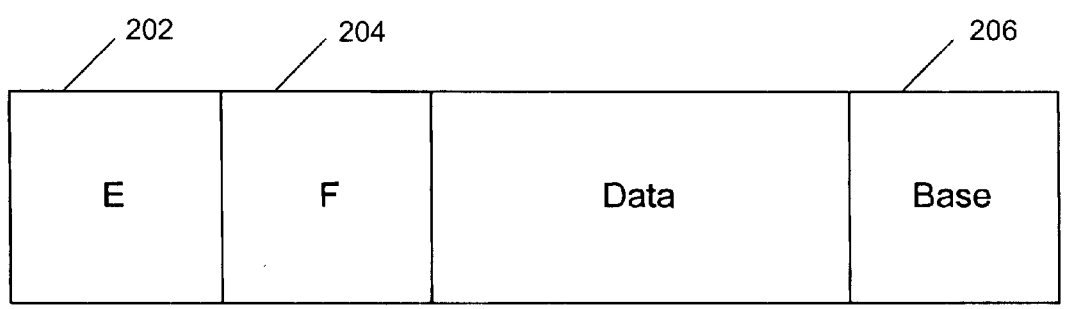
FIG. 3 is a diagram of a register utilized for a scratch pad in accordance with the present invention.

FIG. 3 is a diagram of the register 114 utilized for a scratch pad memory in accordance with the present invention. The register 114 includes an enable (E) bit 202 for enabling the scratch pad memory, a fill (F) bit 204 to fill the scratch pad memory and bits 206 for storing the base address for the instruction tat causes the filling of the scratch pad memory 102 and 104.

There are two important features of the present invention. The first feature is that an instruction can be utilized to fill a scratch pad memory with the appropriate data in an efficient manner. The second feature is that once the scratch pad has the appropriate data, it can be accessed more efficiently to retrieve this data within the cache and memory space not needed for this data. This has a particular advantage for frequently used routines, such as a mathematical algorithm to minimize the amount of space utilized in the cache for such routines. Accordingly, the complexity of the cache is not required using the scratch pad memory as well as space within the cache is not utilized.

The operation of the present invention will be described in the context of the instruction cache 14' and its associated scratch pad memory 102 but one of ordinary skill in the art recognizes that the data cache 16' and its associated scratch pad memory 104 could be utilized in a similar manner.

A system in accordance with the present invention operates in the following manner. First the filling of the scratch pads will be described. Assuming there is a cache miss, then the data from system memory will be read, and the scratch pad memory 102 will be filled. The scratch pad 102 will be filled based upon an instruction resident in the register 114. In a preferred embodiment the enable bit is set to 1 and the fill bit is set to 1 to indicate that data can be loaded into the scratch pad memory. The core processor 12' reads the data from the base address range of the register 114 and this will be the data that will be provided to the scratch pad memory 102. The state machine 112 captures the event of writing into the register 114 and causes the system bus unit 18' to fill the scratch pad memory 102. When the scratch pad memory 102 is filled, the pipeline is released by the processor 12'. Therefore, the scratch pad memory 102 then includes the routine (for example, a mathematical algorithm). Once released, then processing can continue. scratch pad memory 106. The state machine 112 captures the event of writing into the register 114 and causes the system bus unit 16' to fill the scratch pad memory 106. When the scratch pad memory 106 is filled, the pipeline is released by the processor 12'. Therefore, the scratch pad memory 106 then includes the routine (for example, a mathematical algorithm). Once released, then processing can continue.

Next, the accessing of the scratch pad memory 102 will be described. Accordingly, when the particular routine needs to be accessed, first the processor 12' accesses the scratch pad memory 102 to determine whether the data is there. If the data is there, it can be read directly from the scratch pad in a more efficient manner than reading it from the data cache. This can be performed several times to allow the processor to allow for faster access to the data. If the data is not there then the processor accesses the data in the cache. If the data is not within the scratch pad memory or the data cache then the processor will obtain the data from system memory 20'.

Accordingly, through a system and method in accordance with the present invention a processing system's performance is significantly improved since data can be accessed more quickly from the scratch pad memory. In addition, the filling of the scratch pad memory can be accomplished in a simple and straightforward manner.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for improving the performance of a processing system, the processing system including a processor and at least one cache, the system comprising:

a scratch pad memory which can be accessed by the processor;

a mechanism for providing the scratch pad memory with the appropriate data when the data is not within the at least one cache, wherein the scratch pad is smaller than the at least one cache and is accessed by the processor before the at least one cache;

a register within the processor;

a state machine for accessing the register when the scratch pad memory is to be filled;

an instruction within the register for initiating the filling of the scratch pad memory; and a system interface unit for filling the scratch pad memory with the appropriate data.

2. The system of claim 1 wherein the filling of the scratch pad is provided by a system memory.

3. The system of claim 2 wherein the register comprises an enable bit, a fill bit and a base address for the instruction.

* * * * *